United States Patent [19]

Venturini et al.

[11] Patent Number: 5,759,255
[45] Date of Patent: Jun. 2, 1998

[54] PEARLESCENT PIGMENT FOR EXTERIOR USE

[75] Inventors: Michael T. Venturini, Yorktown Hts; Carolyn Lavallee, Croton-on-Hudson; Deborah Cacace, Cold Spring, all of N.Y.

[73] Assignee: Engelhard Corporation, Iselin, N.J.

[21] Appl. No.: 795,347

[22] Filed: Feb. 4, 1997

Related U.S. Application Data

[60] Provisional application No. 60/011,298, Feb. 7, 1996.
[51] Int. Cl.$^6$ .................................................. C04B 14/20
[52] U.S. Cl. .......................... 106/418; 106/417; 106/445; 106/446; 106/490
[58] Field of Search .................................. 106/417, 418, 106/445, 446, 490

[56] References Cited

U.S. PATENT DOCUMENTS

| | | | |
|---|---|---|---|
| 4,545,821 | 10/1985 | Rau et al. | 106/418 |
| 4,828,623 | 5/1989 | Nitta et al. | 106/450 |
| 4,832,944 | 5/1989 | Socci et al. | 106/417 |
| 5,091,011 | 2/1992 | DeLuca, Jr. | 106/417 |
| 5,223,034 | 6/1993 | Nitta et al. | 106/417 |
| 5,326,392 | 7/1994 | Miller et al. | 106/417 |
| 5,423,912 | 6/1995 | Sullivan et al. | 106/418 |
| 5,472,491 | 12/1995 | Duschek et al. | 106/418 |

*Primary Examiner*—Mark L. Bell
*Assistant Examiner*—Scott L. Hertzog
*Attorney, Agent, or Firm*—Ostrolenk, Faber, Gerb & Soffen, LLP

[57] ABSTRACT

A pearlescent pigment having improved humidity resistance and weatherability is realized by a metal oxide-coated mica pearlescent pigment which has an aluminum or an aluminum-cerium combined with a hydrolyzed silane coupling agent treated surface.

25 Claims, No Drawings

PEARLESCENT PIGMENT FOR EXTERIOR USE

BACKGROUND OF THE INVENTION

This case claims priority based on U.S. Provisional patent application Ser. No. 60/011,298, filed Feb. 7, 1996, abandoned.

Imparting a pearlescent luster, metallic luster and/or multi-color effects approaching iridescent can be achieved using a nacreous or pearlescent pigment which comprise a metal oxide-coated micaceous platelet. These pigments were first described in U.S. Pat. Nos. 3,087,828 and 3,087,829 and a description of their properties can be found in Pigment Handbook, Vol. I, Second Edition, pp. 829–858, John Wiley & Sons, New York 1988.

The oxide coating is in the form of a thin film deposited on the surfaces of the mica platelet. The oxide in most wide spread use at present is titanium dioxide. The next most prevalent is iron oxide while other usable oxides include tin, chromium and zirconium oxides as well as mixtures or combinations of the oxides.

The oxide film on the platelets has the optical properties of a thin film and therefore the color reflected by the pigment arises from light interference, which is dependent on the thickness of the coating. For example, thin $TiO_2$ coatings produce a whitish reflection which appears to be pearly or silvery. Reflection colors of gold, red, blue, green, etc. are produced by using progressively thicker coatings. Iron oxide has an inherently red color and the coated mica has both a reflection color arising from light interference and an absorption color arising from absorption of light. The iron oxide-coated mica pigments of greatest commercial interest at present have reflection colors ranging from yellow to red. These pigments are referred to as "bronze", "copper", "rusett", etc.

Forming a coating suitable for exterior use such as, for instance, on the surfaces of an automobile, is complex because the coating must remain essentially unchanged in appearance over a period of several years while, at the same time, it is exposed to a variety of weather conditions. The two major components of the coating are the vehicle and the pigment, and both vary widely in stability properties.

The metal oxide-coated mica pearlescent pigment presents a much more complicated entity with respect to stability problems than single entity pigments such as pigmentary titanium dioxide. Methods and techniques which are used to stabilize pigmentary titanium dioxide, for example, are either ineffective or insufficient to provide stability for titanium dioxide-coated mica platelets. Thus, the behavior of an oxide coated on mica differs significantly from that of the free oxide pigment, as discussed for instance in DeLuca et al. U.S. Pat. No. 4,038,099, col. 3, lines 19–45. Differences also arise because conventional pigmentary titanium dioxide usually has a crystal size of about 0.2 µm while metal oxide-coated mica particles are thin platelets which may have lengths from 2–200 µm, depending on the intended application. Experience in stabilizing conventional pigments is therefore not directly applicable to metal oxide coated mica pigments.

The initial treatments which were employed to stabilize pearlescent pigments for use in exterior coatings applications involved the use of trivalent chromium. Because of its slightly greenish color and the potential impact of chromium on the environment, there has been a movement away from the use of this material in recent years and a number of non-chromium treatments for stabilizing pearlescent pigments have been developed. Nevertheless, the humidity resistance and overall weatherability of the metal oxide-coated mica in paints still has room for improvement. It is the object of the present invention to provide such improved humidity resistance and overall weatherability.

Nitta, U.S. Pat. No. 4,828,623, discloses a process of increasing the water resistance of a titanium dioxide-coated mica pearlescent pigment, which may or may not be aluminum treated, by coating the base material with a hydrated zirconium oxide formed in the presence of hypophosphite. This pigment may be thereafter treated with a silane coupling agent. However, Nitta points out in a later patent, U.S. Pat. No. 5,223,034, that the pigment so made does not stand up under outdoor weather exposure tests and accelerated weatherability tests. The later patent, therefore, overcoats the earlier product with a hydrated cobalt, magnesium or cerium oxide.

Fukui, U.S. Pat. No. 4,818,614, discloses treating a titanium dioxide-coated mica with a silicon polymer and then reacting the silicon polymer with a compound capable of reacting with an SiH moiety to stabilize the pigment. Overcoating with the reactive compound is essential.

Other patents which disclose treating titanium dioxide-coated mica with a silane or siloxane include U.S. Pat. Nos. 5,356,471, 5,326,392 and 5,143,772.

European published patent application No. 0 632 109 A1 describes the problems in obtaining iridescent pigments having sufficient dispersibility and weather resistance in water-dilutable coating composition systems. The publication points out that attempts to modify the surfaces of the iridescent pigment with the aid of organo-functional silanes for the purpose of improving their weather resistance and also, in order to permit them to be employed in coating compositions which can be diluted with water, have led to unsatisfactory results. To overcome these problems, the European published patent application provides an iridescent pigment in which a protective layer which must include silicon dioxide must first be established on a metal oxide-coated mica pearlescent pigment and then at least one further metal oxide or hydrated metal oxide and at least one organic coupling reagent is applied to the surface of the protected metal oxide coated pearlescent pigment. The coupling reagents include organo functional silanes, zirconium aluminates and metal acid esters. See also U.S. Pat. No. 5,472,491.

SUMMARY OF THE INVENTION

The present invention relates to an exterior grade metal oxide-coated pearlescent pigment having improved humidity resistance and overall weatherability, and to a method for the production of such a pigment. The pigment is of particular use in liquid coatings such as the solvent and water borne automotive paint systems consisting of a pigmented basecoat and a clear top coat. The pigments however can be used in any application heretofore known for a pearlescent pigment such as, for example, in flexible PVC, thermoplastic olefins, bidy side moldings, and other plastics.

DESCRIPTION OF THE INVENTION

In accordance with the present invention, a metal oxide-coated mica pearlescent pigment which has an aluminum or aluminum-cerium treated surface is additionally treated with a hydrolyzed silane coupling agent. The resulting pigment has enhanced humidity resistance and overall weatherability.

The metal oxide-coated mica pearlescent pigments used in the present invention are the known titanium dioxide- or iron oxide-coated mica pearlescent pigments. These pigments are well known in the art and can be prepared by any known process. See, for example, U.S. Pat. Nos. 3,087,828 and 3,087,829 as well as DeLuca U.S. Pat. No. 4,038,099. To realize the pigment of the present invention, this pearlescent pigment must also have an aluminum or aluminum-cerium treated surface. Other surface coatings do not provide the results achieved in the present invention.

The coating of the metal oxide-coated mica pigment with a hydrous aluminum oxide per se is known. It is described, for example, in U.S. Pat. No. 5,091,011, the disclosure of which is incorporated herein by reference. Briefly, the pigment is dispersed by stirring in water and then an aluminum compound such as aluminum chloride, aluminum sulfate or aluminum potassium sulfate, and a neutralizing agent such as sodium hydroxide, potassium hydroxide, ammonia or urea, are added simultaneously as aqueous solutions. The resulting hydrolysis causes the hydrous oxide to deposit on the substrate. As described, the aluminum compound must be added slowly enough to permit the formation of a smooth, continuous layer on the platelets and the rate should fall within the range of about 0.03 to 0.1 mg Al per minute per gram of pigment, preferably about 0.005 to 0.07 mg Al/min/g pigment. A quantity of aluminum compound solution is used so as to produce a hydrous aluminum oxide coating containing about 0.05 to 1.2% aluminum, preferably about 0.1 to 0.8% aluminum, based on the total weight of the pigment. Pigments in which the concentration of aluminum is above 1.2% are less effective in stabilization than lower concentrations. After deposition of the coating, the product can be filtered, washed with water and dried at any convenient temperature. Use of a temperature which is high enough to calcine the hydrous aluminum oxide should be avoided.

The coating of the titanium dioxide- or iron oxide-coated mica pearlescent pigment with a coating consisting essentially of a combination of hydrated cerium and aluminum oxides is also per se known. It is described, for instance, in U.S. Pat. No. 5,423,912, the disclosure of which is incorporated herein by reference. Briefly, the pearlescent pigment is dispersed in a liquid from which the cerium and aluminum can be readily precipitated onto the surface of the pigment. This conveniently, and preferably, is an aqueous dispersion. The solid pigment in the dispersion generally comprises about 5 to 30%, preferably about 10 to 20%, and the cerium and aluminum are each added to the dispersion in the form of a salt which is soluble in a liquid medium. While other salts can be used, the nitrate salts are preferred. It is also preferred to deposit about 0.1–1.5% cerium hydroxide, more preferably 0.2–0.6%, calculated as weight percent cerium and about 0.1–1%, more preferably 0.2–0.6%, aluminum hydroxide, calculated as weight percent aluminum, based on the weight of the pigment. The salts can be added to the slurry individually in either order and precipitated or preferably, added simultaneously and precipitated. Precipitation is controlled by raising the pH to a value greater than about 5, preferably to a value of about 5.5–7.5. After completion of the precipitation step, the treated pearlescent product is separated from the dispersion by any convenient means such as, for instance, filtration, centrifugation or settling, washed and dried.

The aluminum- or aluminum-cerium-treated metal oxide-coated mica pearlescent pigment of this invention is additionally treated with a hydrolyzed silane coupling agent or a mixture of such agents. These, as known, are compounds which act as an interface between an organic material and an inorganic material to enhance the affinity between the two. Thus, the silane coupling agents generally have both an organo functional group and a silicon functional group bonded either directly or indirectly to silicon. The silicon functional groups are generally alkoxy groups and preferably $C_{1-4}$ alkoxy groups.

Examples of silane coupling agents which can be used in the present invention are gamma-(2-aminoethyl) aminopropyl trimethoxy silane, aminopropyl trimethoxy silane, gamma-aminopropyl triethoxy silane, gamma-(2-aminoethyl)aminopropyl methyl dimethoxy silane, gamma-methacyryloxypropyl methyl trimethoxy silane, gamma-methacyryloxypropyl trimethoxy silane, gamma-glycidoxypropyl trimethoxy silane, gamma-mercaptopropyl trimethoxy silane, vinyltriacetoxysilane, gamma-chloropropyl trimethoxy silane, vinyltrimethoxy silane, octadecyldimethyl-[3-(trimethoxysilyl)-propyl] ammonium chloride, gamma-mercaptopropyl-methyl-dimethoxy silane, methyltrichloro silane, dimethyl-dichlorosilane, trimethylchlorosilane, gamma-isocyanatopropyl triethoxy silane and the like.

The silane coupling agent should be selected so that it is suitable for any organic material in the coating vehicle which will be combined with the pigment in use. When the organic material is a polyester, the organo functional group preferably comprises a methacryl group. When it is a urethane, an amino functional coupling agent is preferred. For acrylic vehicles, the aminoethyl, aminopropyl, methacryloxypropyl, and glycidaloxypropyl trimethoxy silanes are suitable. More recent results indicate that best results occur with combination of amino & non-amino coupling agents.

The pigment is treated with the silane coupling agent by dry or wet mixing. For instance, an aqueous solution of the agent in water or a mixture of water and an organic solvent can be added to an aqueous slurry of the pearlescent pigment. The silane is preferably prehydrolyzed such as, for instance, by stirring the coupling agent in water for a suitable period of time. It is also possible to effect hydrolyzation at the time of mixing. In general, about 0.1 to 10 wt %, preferably about 0.25 to 5 wt %, of the silane coupling agent is used based on 100 parts by weight of pigment being treated. The coupling agent and pigment are combined for a period of time sufficient to allow reaction to occur, which may last from a few minutes to several hours or more, preferably about 3 to 24 hours. Thereafter the treated pigment can be recovered in the conventional fashion such as by filtration, centrifugation and the like, and dried. It is also possible to combine, if desired, the coupling agent treatment with the aluminum/cerium treatment.

In order to further illustrate the present invention, various non-limiting examples are set forth below. In these examples, as throughout the specification and claims, all parts and percentages are by weight and all temperatures in ° C. unless otherwise indicated.

EXAMPLE 1

A blue-reflecting $TiO_2$-coated mica pigment containing 53% $TiO_2$ and 1% $SnO_2$, with platelets primarily 5 to 40 μm in length, was used as the substrate. Aliquots of the pigment (250 g) were dispersed in 3 liters of distilled water and heated with stirring at 60° C. The pH was adjusted to 5.5 with hydrochloric acid and then a solution of 2.91% $AlCl_3.6H_2O$ (3.3 mg Al/ml) was added at a rate of 4 ml/min for 57 minutes. Simultaneously, a 3.5% caustic solution was added so as to maintain the pH at 5.5. After stirring for 15 minutes, the product was filtered, washed with distilled water and dried at 110° C. The hydrous aluminum oxide contained 0.3% aluminum based on the total weight of the treated pigment.

A charge of 400 g of the aluminum surface treated titanium dioxide-coated mica was placed in a V-shaped tumble blender equipped with an intensifier bar. A hydrolyzed silane coupling agent had been prepared by stirring 100 g of gamma-glycidoxypropyltrimethoxysilane and 22 g of deionized water for 1 hour. The hydrolyzed silane in an amount of 2.44 g was atomized onto the pigment as it was being tumbled in the blender and intensely mixed for about 20 minutes in order to evenly distribute the silane on the pigment. Thereafter the combination was allowed to stand for two hours in order to permit the reaction between the coupling agent and the pigment to reach completion.

EXAMPLE 2

The procedure of Example 1 was followed except that the pigment was a red-reflecting ferric oxide-coated mica (48% $Fe_2O_3$) containing platelets primarily 5 to 40 µm in length. The aluminum chloride solution was added for 114 minutes and the product, after filtering, washing and drying, contained a hydrous oxide having 0.6% aluminum.

EXAMPLE 3

One hundred gram charges of a titanium dioxide-coated mica pigment contained 52% rutile $TiO_2$ and 48% muscovite mica which had a blue interference color and a median particle size of about 20 µm were dispersed in 1 liter of water and heated to 75° C. The pH was adjusted to 6 with dilute nitric acid and then 60 ml of an aqueous solution containing 0.7% $Ce(NO_3).6H_2O$ which had previously been prepared by dissolving 1.2 g of $Ce(NO_3).6H_2O$ in 60 ml of distilled water and 60 ml of an aqueous solution containing 0.5% aluminum nitrate which had been prepared by dissolving 4.2 g of $Al(NO_3).9H_2O$ in 60 ml of distilled water were added over 10 minutes. The pH was maintained at 6 during the cerium and aluminum additions by simultaneously adding a dilute aqueous solution of sodium hydroxide. The suspension was filtered after stirring for 30 minutes, washed with distilled water and dried at 80° C. to produce a product containing 0.4% cerium hydroxide (calculated as Ce) and 0.2% aluminum hydroxide (calculated as Al).

A charge of 400 g of the aluminum-cerium surface treated titanium dioxide-coated mica was placed in a V-shaped tumble blender equipped with an intensifier bar. A hydrolyzed silane coupling agent had been prepared by stirring 100 g of gamma-glycidoxypropyltrimethoxysilane and 22 g of deionized water for 1 hour. The hydrolyzed silane in an amount of 2.44 g was atomized onto the pigment as it was being tumbled in the blender and intensely mixed for about 20 minutes in order to evenly distribute the silane on the pigment. Thereafter the combination was allowed to stand for two hours in order to permit the reaction between the coupling agent and the pigment to reach completion.

EXAMPLE 4

The procedure of Example 3 was repeated except that after heating to 75° C., the pH of the aqueous dispersion of titanium dioxide-coated mica pigment was first adjusted to 4 with dilute nitric acid and the pH was raised to 7 by slowly adding a dilute aqueous sodium hydroxide solution over one hour.

EXAMPLE 5

The procedure of Example 4 was repeated except that the initial pigment was a reddish brown colored iron oxide-coated mica containing 54% hematite and having a medium particle size of about 12 µm. The cerium-aluminum treated pigment contained 0.4% Ce and 0.2% Al.

EXAMPLE 6

A 2% solution of (3-glycidoxypropyl)trimethoxysilane in water, adjusted to a pH of 4 with acetic acid, was allowed to stir for 30 minutes. Enough aluminum treated titanium dioxide-coated mica of Example 1 was added to the solution to obtain a slurry concentration of 20%, all the while stirring the slurry. After about 2.5 hours, the pigment was recovered from the aqueous slurry by filtration and dried at about 80° C. for 16 hours.

EXAMPLE 7

The procedure of Example 1 was repeated except that the silane employed was β-(3,4-epoxycyclohexyl)ethyltrimethoxysilane.

EXAMPLE 8

The procedure of Example 3 was repeated except that the silane was gamma-methacryloxypropyltrimethoxysilane.

EXAMPLE 9

The procedure of Example 1 was repeated except that the silane was a mixture of gamma-glycidyloxypropyltrimethoxysilane and octyltriethoxysilane.

EXAMPLES 10–18

Water-based paints were prepared by incorporating either the silane-aluminum treated titanium dioxide-coated mica pearlescent pigment of Example 1 or the silane-aluminum treated iron oxide-coated mica pigment of Example 2 or the silane-aluminum and cerium treated titanium dioxide-coated mica pigments of Example 4 or the silane-aluminum and cerium treated iron oxide-coated mica pigments of Example 5 into a water based paint composition at a pigment/paint ratio of 0.13. For testing purposes, primed 7.5×15 cm steel panels (APR 25379, supplied by Advanced Coating Technologies of Detroit, Mich.) were coated with 15–20 micron thick pigmented base coat. The base coat was allowed to flash for at least 10 minutes, baked at 85° C. for 6.5 minutes and cooled. Then a clear (unpigmented) top coat was applied to a thickness of 40–45 microns and the resulting panel baked at 140° C. for 30 minutes. Portions of the resulting panels were masked so that exposed portions of the panels could be compared to the non-exposed portions.

The panels were exposed to a 100% humidity atmosphere for 240 hours at about 40° C. and the resulting panels subjected to the ASTM D3359, Vol. 6 adhesion test. The results were rated on a scale of 0 B to 5 B with 0 B representing total cohesive failure (greater than 65%) and 5 B representing no failure. Both the aluminum treated titanium dioxide- and iron oxide-coated mica had ratings of 0 B to 1 B while the silane treated pigments rated 5 B.

Changes in appearance of the panel before exposure and after exposure were evaluated by making distinctness of image (DOI) measurements using a Dorigon II Distinctiveness of Reflected Image Goniophotometer manufactured by Hunter Lab. The retained distinctness of image (% DOI) was calculated by dividing DOI after humidity conditioning by the DOI before humidity conditioning and multiplying by 100. Pigments with a higher % DOI have a better stability than those with a lower % DOI. Both the aluminum treated titanium dioxide- and iron oxide-coated mica pearlescent pigment had a % DOI of about 50% while the corresponding silane treated pigments had a % DOI of about 90%.

The panels were also exposed to outdoor Florida weather for one year after which it could be observed that the silane treated pigment paints had better gloss and DOI retention than the non-silane treated pigments.

EXAMPLES 19–22

Examples 10–13 were repeated except that the paint system was a solvent based paint instead of a water borne paint and the pigment-to-paint ratio was 0.25. In this system, the aluminum treated iron oxide- and titanium dioxide-coated mica pearlescent pigments had a % DOI of about 77% while the corresponding silane samples had a % DOI of about 98%.

EXAMPLES 23–25

Example 3 was repeated three times changing the single coupling agent to a mixture of agents. The three mixtures were gamma-glydicyloxypropyl trimethoxy silane and gamma-aminopropyl triethoxy silane, gamma-aminopropyl triethoxy silane and gamma-trimethacryloxypropyl trimethoxy silane, and gamma-aminopropyl triethoxy silane and gamma-isocyanatopropyl triethoxy silane.

EXAMPLE 26

Example 3 is repeated except that the hydrolyzed silane is added to the $Ce(NO_3)6H_2O$ solution prior to that solution's contact with the titanium dioxide-coated mica pigment.

EXAMPLES 27–28

One hundred grams of a white pearl titanium dioxide-coated mica pigment containing 26% rutile $TiO_2$ and 74% muscovite mica was dispersed in 1 liter water and heated to 75° C. The pH was adjusted to 3 with dilute nitric acid and 2 gm of 20.2% $Ce(NO_3)_3$ solution, 7 gm of a 4.3% $Al(NO_3)_3$ solution and 0.48 gm $NaH_2PO_2.H_2O$ were added to the slurry and stirred approximately 20 minutes. The slurry is slowly raised to pH 8 with 3.5% NaOH over a period of 30 minutes. 3 gm of either 3-glycidoxypropyl trimethoxy silane and 3 gm 3-aminopropyl triethoxy silane or 3 gm of 3-methacryl oxypropyl trimethoxy silane and 3 gm of 3-aminopropyl triethoxy silane were added over a period of 10 minutes. Stirring coninues for 2 hours at 75° C. The slurry was filtered, washed and dried at 140° C.

This procedure can be repeated on a reddish brown iron oxide coated mica containing 54% hematite.

Various changes and modifications can be made in the process and products of this invention without departing from the spirit and scope thereof. The various embodiments which have been describe herein were for the purpose of further illustrating the invention but were not intended to limit it.

What is claimed is:

1. A titanium dioxide- or iron oxide-coated micaceous pearlescent pigment having a first coating thereon consisting essentially of hydrated aluminum oxide or a combination of hydrated cerium and aluminum oxides, and a coating of hydrolyzed silane coupling agent on or intermingled with said first coating.

2. The pearlescent pigment of claim 1 in which said silane coupling agent comprises a non-amino silane coupling agent.

3. The pearlescent pigment of claim 2, in which said silane coupling agent is a combination of a non-amino silane coupling agent and an amino silane coupling agent.

4. The pigment of claim 2 in which the non-amino silane coupling agent contains an alkoxy moiety.

5. The pigment of claim 4 in which the silane coupling agent is a trimethoxy silane coupling agent.

6. The pigment of claim 5 in which the silane coupling agent comprises an alkyl alkoxy silane.

7. The pigment of claim 5 in which the pigment is a titanium dioxide-coated mica.

8. The pigment of claim 5 in which the pigment is an iron oxide-coated mica.

9. The pigment of claim 1 in which the silane coupling agent comprises an aminopropyl triethoxy silane coupling agent.

10. The pigment of claim 1 in which the silane coupling agent is a mixture of at least two silane coupling agents.

11. The pigment of claim 1 in which the coating of silane coupling agent is on said first coating.

12. The pigment of claim 1 in which the pigment is a titanium dioxide-coated mica.

13. The pigment of claim 1 in which the pigment is an iron oxide-coated mica.

14. A method of improving a metal oxide-coated micaceous pearlescent pigment which comprises forming a coating consisting essentially of hydrated aluminum oxide or a combination of hydrated aluminum and cerium oxide on a titanium dioxide- or iron oxide-coated micaceous pearlescent pigment and combining said pigment with a hydrolyzed silane coupling agent simultaneously or subsequently to the formation of said coating.

15. A method of improving a metal oxide-coated micaceous pearlescent pigment which comprises combining a hydrolyzed silane coupling agent with a titanium dioxide- or iron oxide-coated micaceous pearlescent pigment having a coating thereon consisting essentially of hydrated aluminum oxide or a combination of hydrated aluminum and cerium oxide.

16. The method of claim 15 in which said silane coupling agent comprises a non-amino silane coupling agent.

17. The method of claim 16, in which said silane coupling agent is a combination of a non-amino silane coupling agent and an amino silane coupling agent.

18. The method of claim 16 in which the non-amino silane coupling agent contains an alkoxy moiety.

19. The method of claim 18 in which the silane coupling agent is a trimethoxy silane coupling agent.

20. The method of claim 18 in which the silane coupling agent comprises an alkyl alkoxy silane.

21. The method of claim 18 in which the pigment is a titanium dioxide-coated mica.

22. The method of claim 19 in which the pigment is an iron oxide-coated mica.

23. The method of claim 14 in which the silane coupling agent is a mixture of at least two silane coupling agents.

24. The method of claim 14 in which the pigment is a titanium dioxide-coated mica.

25. The method of claim 14 in which the pigment is an iron oxide-coated mica.

* * * * *